United States Patent
Katz et al.

(10) Patent No.: US 10,957,059 B1
(45) Date of Patent: Mar. 23, 2021

(54) MULTI-PATTERN DEPTH CAMERA ASSEMBLY

(71) Applicant: Facebook Technologies, LLC, Menlo Park, CA (US)

(72) Inventors: Dov Katz, Irvine, CA (US); Nadav Grossinger, Foster City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 69 days.

(21) Appl. No.: 15/698,975

(22) Filed: Sep. 8, 2017

Related U.S. Application Data (60) Provisional application No. 62/384,901, filed on Sep. 8, 2016.

(51) Int. Cl.
| | |
|---|---|
| *G06T 7/521* | (2017.01) |
| *H04N 13/254* | (2018.01) |
| *H04N 13/279* | (2018.01) |
| *H04N 13/344* | (2018.01) |
| *G02B 27/01* | (2006.01) |
| *H04N 13/327* | (2018.01) |
| *G06F 3/01* | (2006.01) |
| *H04N 13/271* | (2018.01) |

(52) U.S. Cl.
CPC .......... *G06T 7/521* (2017.01); *G02B 27/0172* (2013.01); *H04N 13/254* (2018.05); *H04N 13/271* (2018.05); *H04N 13/279* (2018.05); *H04N 13/327* (2018.05); *H04N 13/344* (2018.05); *G02B 2027/011* (2013.01); *G02B 2027/014* (2013.01); *G02B 2027/0123* (2013.01); *G02B 2027/0138* (2013.01); *G06F 3/017* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2012/0206452 A1* | 8/2012 | Geisner | G02B 27/017 345/419 |
| 2014/0240464 A1* | 8/2014 | Lee | G01S 17/08 348/47 |
| 2014/0320633 A1* | 10/2014 | Haugen | H04N 5/247 348/87 |
| 2015/0022644 A1* | 1/2015 | Appia | H04N 13/271 348/49 |

* cited by examiner

*Primary Examiner* — Mikhail Itskovich
(74) *Attorney, Agent, or Firm* — Fenwick & West LLP (57) ABSTRACT

A depth camera assembly (DCA) configured to determine distances between the headset and one or more objects in an area surrounding the headset. The DCA includes an imaging device, an illumination source, and a controller. The controller identifies objects in a portion of the local area, determines a depth zone for each object and corresponding structured light (SL) illumination parameters including a SL pattern for each object based on the depth zone, instructs the illumination source to illuminate a scene comprising the one or more objects with the determined SL pattern, and instructs the imaging device to capture images of the illuminated objects. The controller determines the depth information for the illuminated objects and updates the depth information associated with the objects.

21 Claims, 6 Drawing Sheets

MULTI-PATTERN DEPTH CAMERA ASSEMBLY

CROSS REFERENCE TO RELATED APPLICATION

This application claims the benefit of U.S. Provisional Application No. 62/384,901 filed Sep. 8, 2016, which is incorporated by reference in its entirety.

BACKGROUND

The present disclosure generally relates to virtual or augmented reality systems, and more specifically relates to depth camera assemblies that obtain depth information of a local area using various patterns of structured light.

Virtual reality (VR) systems, augmented reality (AR), and mixed reality (MR) systems, can leverage the capture of the environment surrounding a user in three dimensions (3D). However, traditional depth camera imaging architectures are comparably large in size, heavy, and consume significant amounts of power. Example common depth camera imaging architectures for obtaining 3D information of a scene include: time-of-flight (both direct-detect pulses and encoded waveforms), structured light (SL), and stereo vision. Different depth camera imaging architectures provide different strengths and weaknesses, so certain depth camera imaging architectures may provide better performance than others in different operating conditions. However, because of the relatively large size of conventional depth camera imaging architectures, many systems including a depth camera typically use a single type of depth camera imaging architecture configured for a particular use case. As head-mounted systems are increasingly used to perform a broader range of functions in varied operating conditions and environments, including large range of depths, selecting a single depth camera imaging architecture to obtain depth information of an area surrounding the head-mounted system and user may impair the user experience with head-mounted systems.

SUMMARY

A depth camera assembly (DCA) that may be part of a head-mounted display (HMD) includes an illumination source, an imaging device, and a controller. The controller identifies one or more objects in the portion of the local area. The controller determines a depth zone associated with each of the one or more objects using depth information associated with the one or more objects. The controller determines structured light (SL) illumination parameters (e.g., pattern, intensity, and frequency) based on a determined depth zone. Use of different SL illumination parameters in different depth zones allows for greater depth information to be captured in the different depth zones. For example, the local area may contain objects that are relatively near and far from the DCA. For a relatively near object to the DCA, it is possible to use a dense pattern (e.g., grid, lines, or dense pattern of dots) to increase the depth information obtained from the object. For an object relatively far from the DCA, power becomes more of an issue, and the DCA can use a less dense pattern of dots such that the SL pattern has enough power to reach the object at a further distance from the DCA. For example, the DCA may use a SL pattern of horizontal bars for objects relatively near the HMD (e.g. within 1-3 meters) and a SL pattern of dots for objects relatively far away from the HMD (e.g. more than several meters).

The illumination source illuminates the portion of the local area that includes the one or more objects using the determined SL illumination parameters. The imaging device captures one or more images of the illuminated one or more objects. The controller determines the depth information for the illuminated one or more objects and updates the depth information associated with the one or more objects.

In some embodiments, the DCA may be part of a head-mounted display (HMD) for use in a virtual reality (VR), mixed reality (MR), augmented reality (AR), or some combination thereof, system environment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
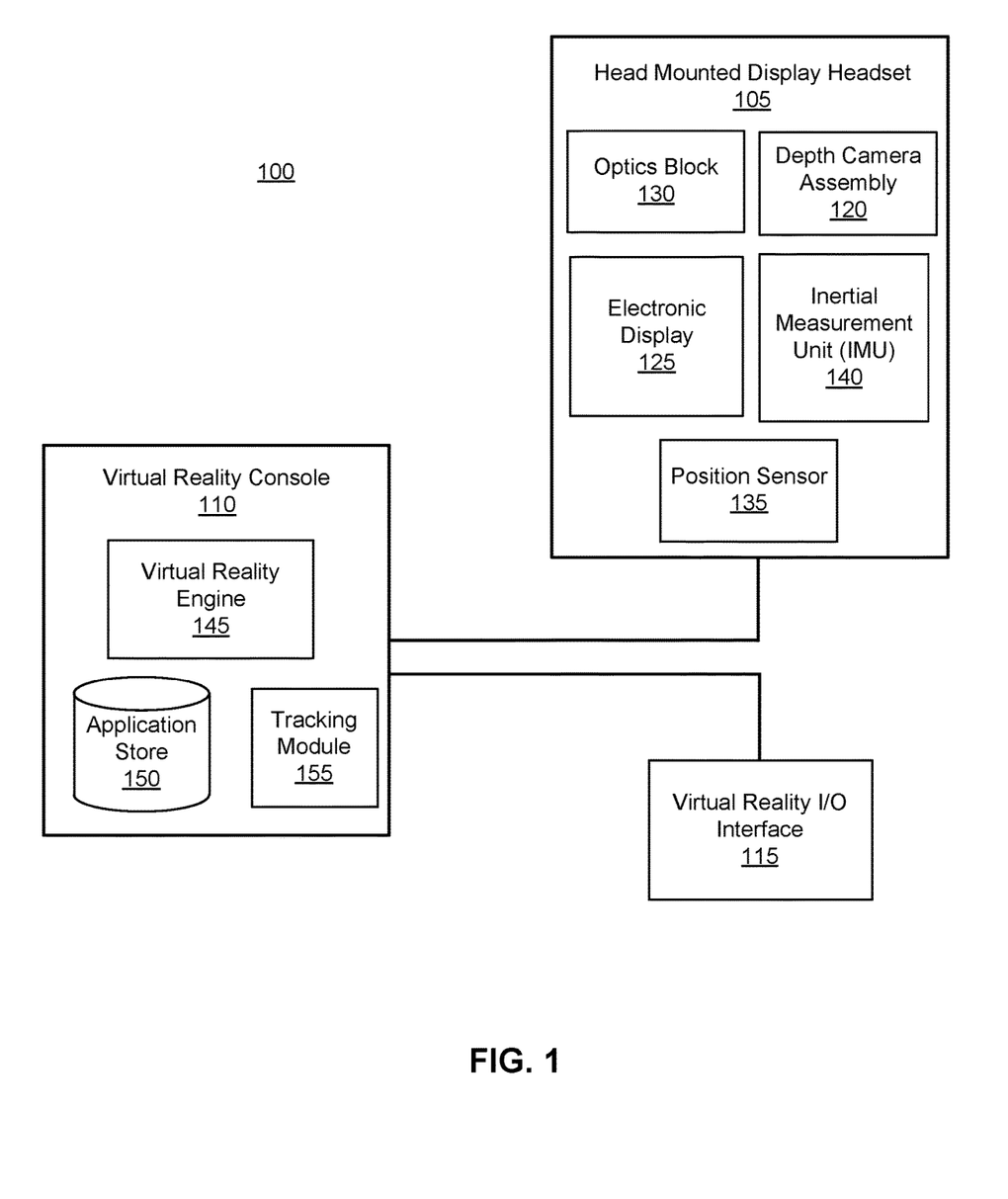
FIG. 1 is a block diagram of a system environment including a multi-pattern depth camera assembly, in accordance with an embodiment.

FIG. 1 is a block diagram of a system 100 including a multi-pattern depth camera assembly 120, according to an embodiment. The system 100 may operate in a VR environment, an augmented reality (AR) environment, a mixed reality (MR) environment, or some combination thereof. The VR system 100 shown by FIG. 1 comprises a HMD 105 and a VR input/output (I/O) interface 115 that is coupled to a console 110. While FIG. 1 shows an example system 100 including one HMD 105 and one VR I/O interface 115, in other embodiments any number of these components may be included in the system 100. For example, there may be multiple HMDs 105 each having an associated VR I/O interface 115, with each HMD 105 and VR I/O interface 115 communicating with the console 110. In alternative configurations, different and/or additional components may be included in the system 100. Additionally, functionality described in conjunction with one or more of the components shown in FIG. 1 may be distributed among the components in a different manner than described in conjunction with FIG. 1 in some embodiments. For example, some or all of the functionality of the console 110 is provided by the HMD 105.

The HMD 105 is a head-mounted display that presents content to a user comprising augmented views of a physical, real-world environment with computer-generated elements (e.g., two dimensional (2D) or three dimensional (3D) images, 2D or 3D video, sound, etc.). In some embodiments, the presented content includes audio that is presented via an external device (e.g., speakers and/or headphones) that receives audio information from the HMD 105, the console 110, or both, and presents audio data based on the audio information. The HMD 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 105 may also act as a VR headset that presents virtual content to the user that is based in part on a real environment surrounding the user. For example, virtual content may be presented to a user of the HMD. The user physically may be in a room, and virtual walls and a virtual floor of the room are rendered as part of the virtual content.

The HMD 105 includes a multi-pattern depth camera assembly also referred to as a depth camera assembly (DCA) 120, an electronic display 125, an optics block 130, one or more position sensors 135, and an inertial measurement Unit (IMU) 140. Some embodiments of The HMD 105 have different components than those described in conjunction with FIG. 1. Additionally, the functionality provided by various components described in conjunction with FIG. 1 may be differently distributed among the components of the HMD 105 in other embodiments, or be captured in separate assemblies remote from the HMD 105.

The DCA 120 captures data describing depth information of an area surrounding the HMD 105. The data describing depth information is associated with structured light (SL) technique to determine depth information. The DCA 120 can compute the depth information using the data, or the DCA 120 can send this information to another device such as the console 110 that can determine the depth information using data from the DCA 120.

In one embodiment, the DCA 120 includes an illumination source, an imaging device, and a controller. The illumination source emits SL of different types (e.g. lines, grids, or dots) onto a portion of an area surrounding the HMD. There may be one or more illumination sources to emit different types of SL. For example, a single illumination source may emit different types of SL by using a single emitter coupled with different diffractive optical elements (DOEs) to produce different patterns of SL. In another example, two illumination sources may emit different types of SL by using a first emitter coupled with a first DOE to emit a first pattern of SL and a second emitter coupled with a second DOE to emit a second pattern of SL. This SL may be infrared light of wavelengths that are invisible to users, pulsed at a high frequency that the user cannot detect, or some combination thereof. The deformation of the SL pattern on surfaces of objects allows the DCA 120 to determine the depth and surface information of objects in the area surrounding the DCA 120. The imaging device captures images of SL from the illumination source that is reflected from objects in a portion of the area surrounding the DCA 120. The imaging device may be a detector array, camera or video camera. There may be one or more imaging devices to capture different types of SL. For example, a single imaging device could capture different types of SL. In another example, a first imaging device may capture SL in a first pattern emitted from a first illumination source, and a second imaging device may capture SL in a second pattern emitted from a second illumination source. The controller determines the initial depth information of objects in a portion of the area surrounding the DCA 120 using a SL technique. Based on the initial depth information, the controller instructs the illumination source to emit a specific type of SL. The controller also instructs the imaging device to capture images the emitted SL of the illumination source. The controller may then determines the depth information and/or material properties (e.g., metal, skin, etc.) of objects in the scene. Additional detail regarding operation of the DCA 120 is discussed below with regard to FIG. 3.

The electronic display 125 displays 2D or 3D images to the user in accordance with data received from the console 110. In various embodiments, the electronic display 125 comprises a single electronic display or multiple electronic displays (e.g., a display for each eye of a user). Examples of the electronic display 125 include: a liquid crystal display (LCD), an organic light emitting diode (OLED) display, an active-matrix organic light-emitting diode display (AMOLED), some other display, or some combination thereof.

The optics block 130 magnifies image light received from the electronic display 125, corrects optical errors associated with the image light, and presents the corrected image light to a user of the HMD 105. In various embodiments, the optics block 130 includes one or more optical elements. Example optical elements included in the optics block 130 include: an aperture, a Fresnel lens, a convex lens, a concave lens, a filter, a reflecting surface, or any other suitable optical element that affects image light. Moreover, the optics block 130 may include combinations of different optical elements. In some embodiments, one or more of the optical elements in the optics block 130 may have one or more coatings, such as partially reflective or anti-reflective coatings.

Magnification and focusing of the image light by the optics block 130 allows the electronic display 125 to be physically smaller, weigh less, and consume less power than larger displays. Additionally, magnification may increase the field of view of the content presented by the electronic display 125. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 130 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 125 for display is pre-distorted, and the optics block 130 corrects the distortion when it receives image light from the electronic display 125 generated based on the content.

The IMU 140 is an electronic device that generates data indicating a position of the HMD 105 based on measurement signals received from one or more of the position sensors 135 and from depth information received from the DCA 120. A position sensor 135 generates one or more measurement signals in response to motion of the HMD 105. Examples of position sensors 135 include: one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more position sensors 135, the IMU 140 generates data indicating an estimated current position of the HMD 105 relative to an initial position of the HMD 105. For example, the position sensors 135 include multiple accelerometers to measure translational motion (forward/back, up/down, left/right) and multiple gyroscopes to measure rotational motion (e.g., pitch, yaw, roll). In some embodiments, the IMU 140 rapidly samples the measurement signals and calculates the estimated current position of the HMD 105 from the sampled data. For example, the IMU 140 integrates the measurement signals received from the accelerometers over time to estimate a velocity vector and integrates the velocity vector over time to determine an estimated current position of a reference point on the HMD 105. Alternatively, the IMU 140 provides the sampled measurement signals to the console 110, which interprets the data to reduce error. The reference point is a point that may be used to describe the position of the HMD 105. The reference point may generally be defined as a point in space or a position related to the HMD's 105 orientation and position.

The IMU 140 receives one or more parameters from the console 110. As further discussed below, the one or more parameters are used to maintain tracking of the HMD 105. Based on a received parameter, the IMU 140 may adjust one or more IMU parameters (e.g., sample rate). In some embodiments, certain parameters cause the IMU 140 to update an initial position of the reference point so it corresponds to a next position of the reference point. Updating the initial position of the reference point as the next calibrated position of the reference point helps reduce accumulated error associated with the current position estimated the IMU 140. The accumulated error, also referred to as drift error, causes the estimated position of the reference point to "drift" away from the actual position of the reference point over time. In some embodiments of the HMD 105, the IMU 140 may be a dedicated hardware component. In other embodiments, the IMU 140 may be a software component implemented in one or more processors.

The VR I/O interface 115 is a device that allows a user to send action requests and receive responses from the console 110. An action request is a request to perform a particular action. For example, an action request may be an instruction to start or end capture of image or video data, or an instruction to perform a particular action within an application. The VR I/O interface 115 may include one or more input devices. Example input devices include: a keyboard, a mouse, a game controller, or any other suitable device for receiving action requests and communicating the action requests to the console 110. An action request received by the VR I/O interface 115 is communicated to the console 110, which performs an action corresponding to the action request. In some embodiments, the VR I/O interface 115 includes an IMU 140, as further described above, that captures calibration data indicating an estimated position of the VR I/O interface 115 relative to an initial position of the VR I/O interface 115. In some embodiments, the VR I/O interface 115 may provide haptic feedback to the user in accordance with instructions received from the console 110. For example, haptic feedback is provided when an action request is received, or the console 110 communicates instructions to the VR I/O interface 115 causing the VR I/O interface 115 to generate haptic feedback when the console 110 performs an action.

The console 110 provides content to the HMD 105 for processing in accordance with information received from one or more of: the DCA 120, the HMD 105, and the VR I/O interface 115. In the example shown in FIG. 1, the console 110 includes an application store 150, a tracking module 155 and a VR engine 145. Some embodiments of the console 110 have different modules or components than those described in conjunction with FIG. 1. Similarly, the functions further described below may be distributed among components of the console 110 in a different manner than described in conjunction with FIG. 1.

The application store 150 stores one or more applications for execution by the console 110. An application is a group of instructions, that when executed by a processor, generates content for presentation to the user. Content generated by an application may be in response to inputs received from the user via movement of the HMD 105 or the VR I/O interface 115. Examples of applications include: gaming applications, conferencing applications, video playback applications, or other suitable applications.

The tracking module 155 calibrates the VR system environment 100 using one or more calibration parameters and may adjust one or more calibration parameters to reduce error in determination of the position of the HMD 105 or of the VR I/O interface 115. For example, the tracking module 155 communicates a calibration parameter to the DCA 120 to adjust the focus of the DCA 120 to more accurately determine positions of SL elements captured by the DCA 120. Calibration performed by the tracking module 155 also accounts for information received from the IMU 140 in the HMD 105 and/or an IMU 140 included in the VR I/O interface 115. Additionally, if tracking of the HMD 105 is lost (e.g., the DCA 120 loses line of sight of at least a threshold number of SL elements), the tracking module 155 may re-calibrate some or all of the VR system environment 100.

The tracking module 155 tracks movements of the HMD 105 or of the VR I/O interface 115 using information from the DCA 120, the one or more position sensors 135, the IMU 140 or some combination thereof. For example, the tracking module 155 determines a position of a reference point of the HMD 105 in a mapping of a local area based on information from the HMD 105. The tracking module 155 may also determine positions of the reference point of the HMD 105 or a reference point of the VR I/O interface 115 using data indicating a position of the HMD 105 from the IMU 140 or using data indicating a position of the VR I/O interface 115 from an IMU 140 included in the VR I/O interface 115, respectively. Additionally, in some embodiments, the tracking module 155 may use portions of data indicating a position or the HMD 105 from the IMU 140 as well as representations of the local area from the DCA 120 to predict a future location of the HMD 105. The tracking module 155 provides the estimated or predicted future position of the HMD 105 or the VR I/O interface 115 to the VR engine 145.

The VR engine 145 generates a 3D mapping of the area surrounding the HMD 105 (i.e., the "local area") based on information received from the HMD 105. In some embodiments, the VR engine 145 determines depth information for the 3D mapping of the local area based on information received from the DCA 120 that is relevant for techniques used in computing depth. The VR engine 145 may calculate depth information using one or more techniques to compute depth based on SL. A SL technique may include, e.g., using triangulation and/or perceived deformation of a SL pattern that is projected onto a surface to determine depth and surface information of objects within the scene. In various embodiments, the VR engine 145 uses different types of information determined by the DCA 120 or a combination of types of information determined by the DCA 120.

The VR engine 145 also executes applications within the VR system environment 100 and receives position information, acceleration information, velocity information, predicted future positions, or some combination thereof, of the HMD 105 from the tracking module 155. Based on the received information, the VR engine 145 determines content to provide to the HMD 105 for presentation to the user. For example, if the received information indicates that the user has looked to the left, the VR engine 145 generates content for the HMD 105 that mirrors the user's movement in a virtual environment or in an environment augmenting the local area with additional content. Additionally, the VR engine 145 performs an action within an application executing on the console 110 in response to an action request received from the VR I/O interface 115 and provides feedback to the user that the action was performed. The provided feedback may be visual or audible feedback via the HMD 105 or haptic feedback via the VR I/O interface 115.

Figure 2:
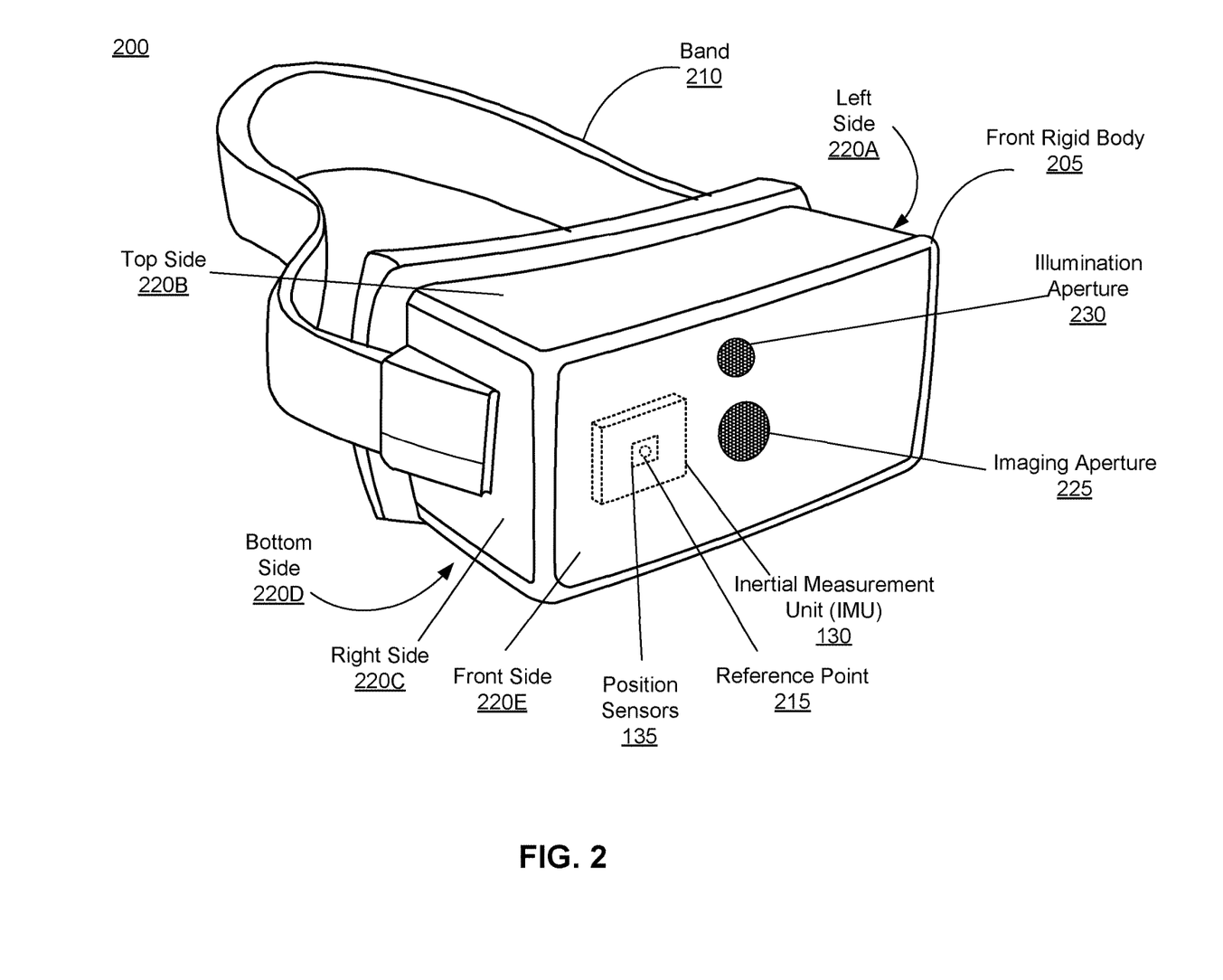
FIG. 2 is a diagram of a HMD, in accordance with an embodiment.

FIG. 2 is a wire diagram of one embodiment of a HMD 200. The HMD 200 is an embodiment of the HMD 105, and includes a front rigid body 205, a band 210, a reference point 215, a left side 220A, a top side 220B, a right side 220C, a bottom side 220D, and a front side 220E. The HMD 200 shown in FIG. 2 also includes an embodiment of the DCA 120 and depicts an imaging aperture 225 and an illumination aperture 230. The DCA 120 includes one or more illumination sources (not shown) that emits SL through the illumination aperture 230. The DCA 120 also includes one or more imaging devices (not shown) that capture SL from the illumination source and ambient light in the local area through the imaging aperture 225.

Although a single imaging aperture 225 and a single illumination aperture 230 are shown in the embodiment of FIG. 2, other embodiments may include multiple illumination apertures corresponding to multiple illumination sources and multiple imaging apertures corresponding to multiple imaging devices. For example, there could be two illumination apertures, a first illumination aperture corresponding to a first illumination source producing a first SL pattern and a second illumination aperture corresponding to a second illumination source producing a second SL pattern. Similarly, there could be a first imaging aperture corresponding to a first imaging device to capture a first SL pattern and a second imaging aperture corresponding to a second imaging device to capture a second SL pattern.

The front rigid body 205 includes one or more electronic display elements of the electronic display 125 (not shown), the IMU 140, the one or more position sensors 135, and the reference point 215. In some embodiments, of the front rigid body 205 may be at least partially transparent to visible light. For example, the front side 220E, the right side 220C, the left side 220A, the top side 220b, the bottom side 220D, or any combination thereof, may be at least partially transparent to visible light. Similarly, components within the HMD 200 may be at least partially transparent to visible light, such that a user is able to look through the HMD 200 into a local area surrounding the user.

Figure 3:
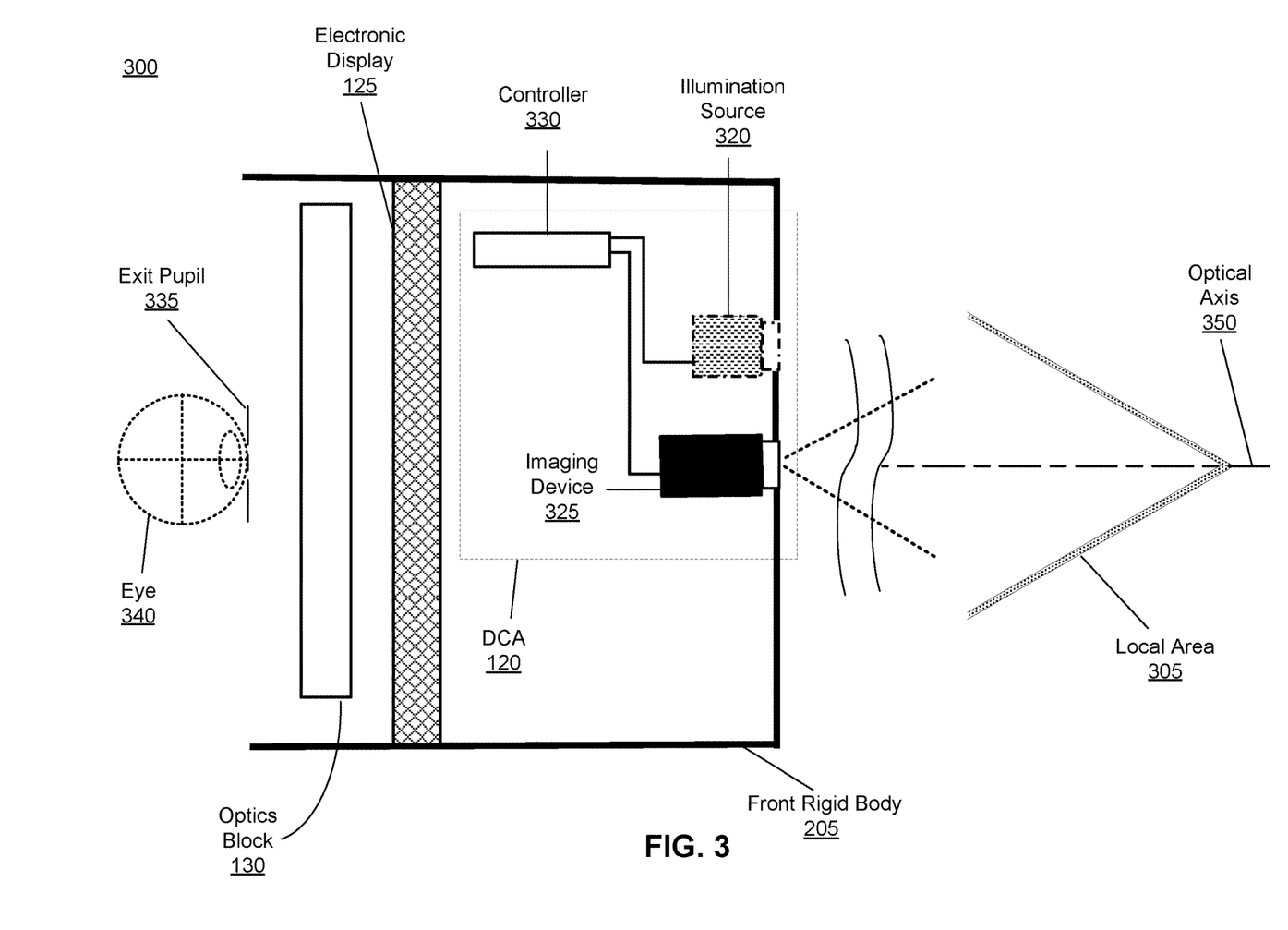
FIG. 3 is a cross section of a front rigid body of the HMD depicted in FIG. 2, in accordance with an embodiment.

FIG. 3 is a cross section 300 of the front rigid body 205 of the HMD headset 200 depicted in FIG. 2. As shown in FIG. 3, the front rigid body 205 includes an illumination source 320, an imaging device 325, and a controller 330. The front rigid body 205 also has an optical axis 350 corresponding to a path along which light propagates through the front rigid body 205. In some embodiments, the imaging device 325 is positioned along the optical axis 350 and captures images of a local area 305, which is a portion of an environment surrounding the front rigid body 205 within a field of view of the imaging device 325. Additionally, the front rigid body 205 includes the electronic display 125 and the optics block 130, which are further described above in conjunction with FIG. 1. The front rigid body 205 also includes an exit pupil 335 where the user's eye 340 is located. For purposes of illustration, FIG. 3 shows a cross section of the front rigid body 205 in accordance with a single eye 340. Although the cross section of FIG. 3 depicts the DCA 120 and the eye 340 being in the same plane for simplicity, the DCA 120 and the eye 340 may be in different planes. For example, in the embodiment shown in FIG. 2, the illumination aperture 230 and imaging aperture 225 of the DCA 120 are located in at a center vertical cross section HMD headset 200, while the eyes of the user are positioned on the right and left side of this center vertical cross sectional plane. The local area 305 reflects incident ambient light as well as light projected by the illumination source 320.

As described above in conjunction with FIG. 1, the electronic display 125 emits light forming an image toward the optics block 130, which alters the light received from the electronic display 125. The optics block 130 directs the altered image light to the exit pupil 335. FIG. 3 shows a cross section 300 of the front rigid body 205 for a single eye 340 of the user, with another electronic display 125 and optics block 130, separate from those shown in FIG. 3, included in the front rigid body 205 to present content, such as an augmented representation of the local area 305 or virtual content, to another eye of the user.

The depth camera assembly (DCA) 120 includes the illumination source 320, the imaging device 325, and the controller 330. The illumination source 320 illuminates a local area 305 with SL. Although FIG. 3 depicts a single illumination source 320, there may be multiple illumination sources, each illumination source may have a corresponding illumination aperture.

The illumination source 320 may be configured to display different patterns of SL. The illumination source 320 may be a single emitter with multiple DOEs or multiple emitters with corresponding DOEs. In one embodiment, the illumination source 320 is a single emitter (e.g. edge emitter laser diode) with multiple DOEs to change the SL pattern of emitted light. In this embodiment, multiple DOEs could be attached to a moving assembly configured to align a single DOE of the multiple DOEs to the single emitter to produce a SL pattern of emitted light corresponding to the aligned DOE. In other embodiments, the illumination source 320 may include multiple emitters as separate edge emitter laser diodes, a row of lasers on the same substrate (e.g. laser bar), or a vertical cavity surface emitting laser (VCSEL), and each emitter may have a corresponding DOE to produce different SL patterns of emitted light (e.g. lines, grid, or dots). For the separate edge emitter laser diodes embodiment, the illumination source 320 may include a first emitter with a first DOE and a second emitter with a second DOEs to produce different patterns of SL (e.g., a pattern of lines and a pattern of dots). For a laser bar embodiment, the illumination source 320 may include a first emitter and second emitter on the same substrate, with a corresponding first DOE and second DOE to produce different patterns of SL. For a VCSEL embodiment, the VCSEL may include first and second lasers with corresponding first and second DOE to produce different patterns of SL. The VCSEL emits light perpendicular to the top surface of the laser instead of the edge as in conventional edge emitter laser diodes and can support an array of lasers on a single substrate. The VCSEL has a potential reduction in size over using conventional edge emitter laser diodes, but typically has lower intensities than conventional edge emitter laser diodes. Each laser in an array of lasers of the VCSEL could have its own DOE to produce SL. The array of lasers of the VCSEL could be modulated individually or as a group to produce SL.

The illumination source 320 may be configured to display different intensities, bands, or frequency of patterns of SL. The illumination source 320 may increase the intensity of a pattern by increasing the power or the number of emitters that are turned on of the illumination source 320. The one or more emitters of the illumination source 320 may emit the same spectrum of light, or each emitter may emit a different spectrum or particular range of wavelengths of light (i.e., "bands" of light). Example bands of light emitted by the illumination source 320 include: a visible band (~380 nm to 750 nm), an infrared (IR) band (~750 nm to 2,200 nm), an ultraviolet band (100 nm to 380 nm), another portion of the electromagnetic spectrum, or some combination thereof. The illumination source 320 may display one pattern of SL at certain times and a different pattern of SL at other times and may change the frequency at which each pattern is shown.

The imaging device 325 captures images of a SL pattern projected onto to local area 305 by the illumination source 320. The imaging device 325 may be a detector array, camera, or video camera. In one embodiment, a single imaging device 325 may capture different SL patterns from one or more illumination sources. Although FIG. 3 depicts a single imaging device 325, there may be multiple imaging devices, each imaging device may have a different imaging aperture with different FOVs. In another embodiment, a first imaging device could capture a SL pattern from a first illumination source and a second imaging device to capture a second SL pattern from a second illumination source. The imaging device 325 can also be configured to capture different bands of light, and different bands of light may correspond to different illumination sources. The imaging device 325 may include a single detector or multiple detectors. The multiple detectors of a single imaging device 325 may provide different views of the same scene or views of different scenes.

The controller 330 controls one or more components in the DCA 120. In one embodiment, the controller 330 determines initial depth information of objects in the local area 305 using the captured images and a structured light depth sensing technique. The controller 330 determines that one or more objects in the local area 305 is within a depth zone based on the initial depth information and selects a structured light type based on the determined depth zone. For example, the controller 330 may select a series of horizontal bars as the SL pattern for objects relatively near the HMD (e.g. within 1-3 meters) and a SL pattern of dots for objects relatively far away from the HMD (e.g. more than several meters). A pattern of lines may have certain advantages for determining depth information of a nearby object. For example, lines provide more detailed depth information than a pattern of dots. Lines projected onto surfaces of objects are distorted from other perspectives other than the illumination source 320. This distortion can be used to determine geometric reconstruction of surface shapes.

In one embodiment, the controller 330 determines specific features of the line pattern such as the density, orientation, intensity of the line pattern and varying intensity along the line pattern. For example, the controller 330 may determine a line pattern with higher density of lines could be used to reveal more detail about objects in the local area 305. The controller 330 may determine a line pattern with higher intensity of light could be used if the object tends to absorb light well for a greater intensity of reflected light. The controller 330 may determine a lower intensity of light could be used if the object tends to reflect light well, for a power savings mode. The controller 330 may determine a particular orientation of the pattern of lines could be used, such as the pattern of lines fall perpendicular to certain features of the object, for example the fingers of the hand 410. The controller 330 may determine a line pattern with varying the intensity along the line could be used to improve the detail of the gathered depth information.

The controller 330 may switch between different SL patterns to facilitate determining the depth information for different depth zones of a scene. The controller 330 may, e.g., adjust a frequency that a particular SL pattern is emitted by the illumination source 320. As the imaging device 325 captures images of the scene at a particular frame rate, the image frames are of the scene illuminated by at least one SL pattern. A frame frequency refers to how often a particular SL pattern shows up in a captured image frame. The frequency with which a single SL pattern is emitted may be dependent on factors such as the location of the user's gaze, motion of objects in the scene, distribution of objects in the scene, or some combination thereof. For example, if an object at a particular depth zone in a scene is static relative to the user, the controller 330 reduces the frequency that a SL pattern associated with the depth zone is emitted by the illumination source 320. Accordingly, the controller 330 may reduce the frame frequency for that depth zone relative to other depth zones that may contain moving objects. In the case where objects are distributed across multiple depth zones, the controller 330 may distribute the frequency of frames of a particular SL pattern based on the number of objects of interest in each depth zone (e.g., if most objects are far from the user, the controller 330 may distribute a greater frame frequency of a SL pattern of dots than the frame frequency of a SL pattern of lines). If the objects in a scene are moving relative to the user, the controller 330 may determine a frame frequency of a specific SL pattern may be based on a rate of movement of the objects in the scene. In one embodiment, the controller 330 may increase the frame frequency of SL patterns based on which objects are moving relative to a user's gaze. For example, if the user's hands are moving in a field of view of the scene visible to the user the controller 330 may increase the frame frequency of a SL pattern of lines to track the user's hands.

In another embodiment, the controller 330 determines the initial depth information and/or material properties of objects in the local area 305 using the captured images and a SL depth sensing technique. In one embodiment, the initial depth information could be determined by a default pattern of SL. The default pattern of SL could be a pattern of dots, a pattern of lines, some combination thereof, or other pattern of SL. The controller 330 could determine the depth of objects in the local area 305 based on images captured from the imaging device 325 of the default pattern of SL. In another embodiment, the initial depth information could be determined by a set of different patterns of SL.

A material property is a property of the material that may be determined via analysis of one or more captured images of the object. Material properties may include, e.g., material type (e.g., metal, wood, skin, etc.), reflectance, material size, material color, some other property that may be determined from one or more captured images, or some combination thereof.

The controller 330 may sort objects in the local area 305 into groups by material property and determine initial depth information for a group of objects. The controller 330 determines that the group of objects is within a depth zone based on the initial depth information of the group and selects a SL type based on the determined depth zone. The controller 330 instructs the illumination source 320 to emit light of the selected SL type. The controller 330 instructs the imaging device 325 to capture images of the selected SL type emitted from the illumination source 320. The controller 330 can then determine the depth information of a group of objects in the local area 305. For example, a material type could be human skin (e.g., hands of the user in the captured images), and the material properties of human skin could include the reflectance spectrum of human skin, and the controller 330 can sort objects such as hands into the same group of objects based on having similar material properties. The details of the illumination source 320, the imaging device 325, and the controller 330 are further described in FIG. 4.

Figure 4:
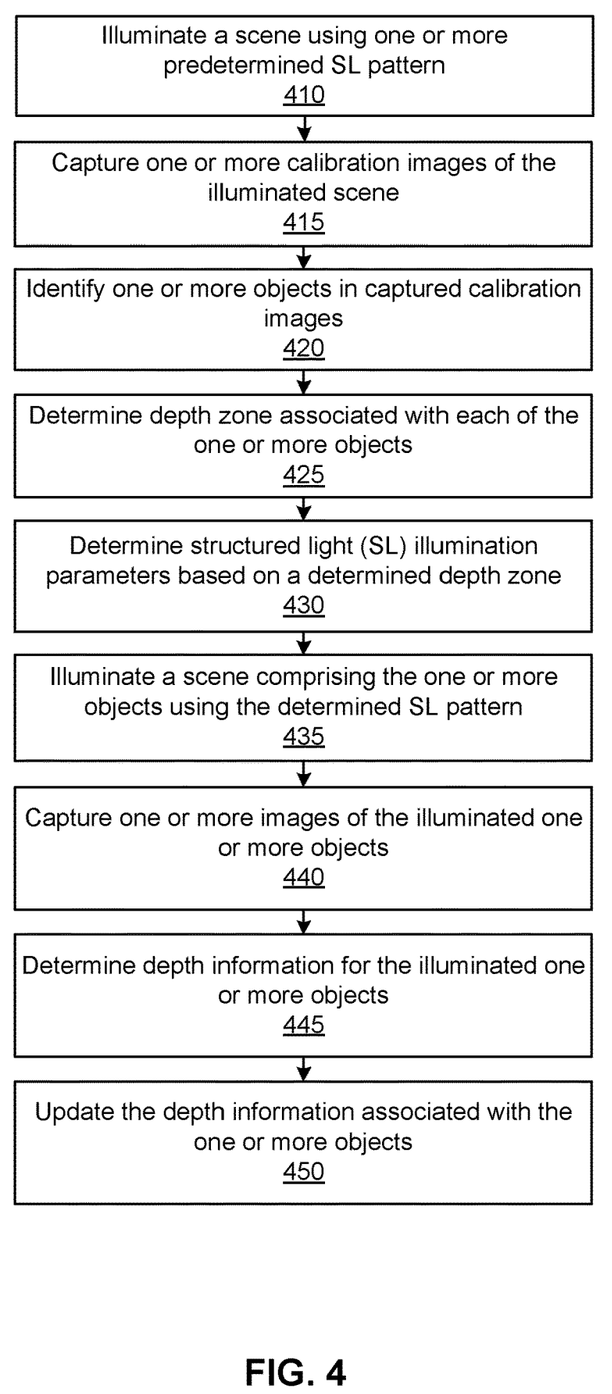
FIG. 4 is a flowchart illustrating a process of generating depth information for one or more objects in a scene, according to one embodiment.

FIG. 4 shows a flow chart illustrating a process of generating depth information for one or more objects in a scene, according to one embodiment. In one embodiment, the process of FIG. 4 is performed by the DCA 120. Other entities may perform some or all of the steps of the process in other embodiments (e.g., a console 110). Likewise, embodiments may include different and/or additional steps, or perform the steps in different orders.

The DCA 120 illuminates 410 a scene using one or more predetermined SL patterns corresponding to an estimated FOV of the DCA 120. Use of a single predetermined pattern may have a speed advantage over multiple patterns. The predetermined SL pattern may be a pattern of dots, which allows the illumination to reach distances both near and far from the DCA 120. The predetermined SL pattern may be a superposition of a pattern of dots and a pattern of lines, which allows the illumination to reach distances both near and far from the DCA 120. Use of multiple predetermined patterns may have the advantage of increased depth information over a single pattern. The predetermined SL pattern may be a sequence of SL patterns which may include an SL pattern of dots, a SL pattern of lines, and different density SL patterns of dots and lines. A sequence of different density SL pattern of dots may be used to allow a dense SL pattern of dots to reach distances near the DCA 120 and a sparse SL pattern of dots to reach distances far from the DCA 120. Likewise, a sequence of an SL pattern of dots and an SL pattern of lines may be used for the same reason. The DCA 120 may illuminate the scene using the illumination source 320 through the controller 330.

The DCA 120 captures 415 one or more calibration images of the illuminated scene corresponding to an estimated FOV of the DCA 120. In some embodiments, the DCA 120 captures a single calibration image if there is only one predetermined SL pattern. In some embodiments, the DCA 120 captures multiple calibration images corresponding to multiple SL patterns which are shown in a sequence of SL patterns. The DCA 120 captures these calibration images through use of the imaging device 325, and coordinates the capture with the controller 330 using timing of the SL illumination from the illumination source 320.

The DCA 120 identifies 420 one or more objects in the estimated FOV. The DCA 120 determines depth information for some or all of the illuminated scene. Based on triangulation, or perceived deformation of then SL pattern when projected onto surfaces, depth and surface information of objects within the scene is determined. The DCA 120 uses depth information from the captured calibration images to identify objects. The DCA 120 may identify objects based on proximity and similarity of the depth information in the estimated FOV. The captured calibration images may also include additional information (e.g., wavelength spectrum, color, intensity) which may be used in conjunction with depth information to determine objects in the estimated FOV.

The DCA 120 determines 425 a depth zone for the one or more objects relative to the DCA 120 using depth information associated with the one or more objects. A depth zone is a range of depths (e.g., 1 meter to 3 meters, greater than 3 meters) from the DCA 120. For example, there may be a depth zone for distances less than a meter from the DCA 120, from 1 to 3 meters from the DCA 120, and greater than 3 meters from the DCA 120. While the previous example lists three depth zones, there may be more or less, additionally, in other embodiments the range of depths for one or more depth zones may vary. An object has a maximum depth and a minimum depth associated with the depth information associated with the object. The depth range for an object may be the minimum depth to the maximum depth for the object. The depth range for an object can be mapped to a depth zone that has the most overlap with the depth range. In one embodiment, the DCA 120 may average the depth information of an object to determine an average depth of the object and determine the depth zone based on the average depth of the object. For example, the DCA 120 may determine a depth range for an object to be 2.5 meters to 3.5 meters, and the average depth of the object to be 2.7 meters. The DCA determines a depth zone for the object to be 1 meter to 3 meters relative to the DCA.

The DCA 120 determines 430 SL illumination parameters such as pattern, intensity, and frequency of a specific pattern based on a determined depth zone. In one embodiment, the DCA 120 may have a set of stored SL illumination parameters corresponding to a set of depth zones, and the DCA 120 determines the SL illumination parameters by mapping the corresponding SL illumination parameters to the determined depth zone. The DCA 120 may determine a pattern with increased density for a depth zone with smaller depth information vs. a depth zone with larger depth information (e.g., grid vs. lines, lines vs. dots, more dots vs. fewer dots). In some embodiments, the DCA 120 increase intensity of the SL illumination for a depth zone with a larger range of depth information vs. a depth zone with smaller range of depth information (e.g., depth information ranging over 60 meter versus 5 meters). The DCA 120 may also increase the frequency (e.g., times per second that a pattern is emitted) of a specific pattern illuminates a scene (and the corresponding frequency the scene is images) based on the depth zone such that the DCA 120 may gather information at a greater rate for certain patterns and/or objects. For example, a higher frequency may be beneficial to provide better resolution in tracking objects (e.g., user's hands) moving in the local area—whereas a lower frequency may be used to monitor static objects (e.g., walls).

The DCA 120 illuminates 435 a scene comprising the one or more objects using SL with the determined SL illumination parameters. The DCA 120 may be configured to display different patterns, intensities, bands, or frequency of patterns of SL.

The DCA 120 captures 440 one or more images of the illuminated one or more objects. The DCA 120 coordinates the capturing of one or more images to the illumination of the scene based on the determined SL illumination pattern. The captured images may also contain information on intensity, wavelength spectrum, and color of the SL illumination.

The DCA 120 determines 445 the depth information for the illuminated one or more objects. The DCA 120 uses a structured light technique to determine depth information for the illuminated one or more objects. As noted above, the structured light technique uses the geometrical deformation of the structured light on an object's surface to determine the depth and surface information of the object.

The DCA 120 updates 450 the depth information associated with the one or more objects. The DCA 120 may be part of a HMD, and the HMD may use the updated depth information to render virtual content to be presented to a user of the HMD.

Figure 5A:
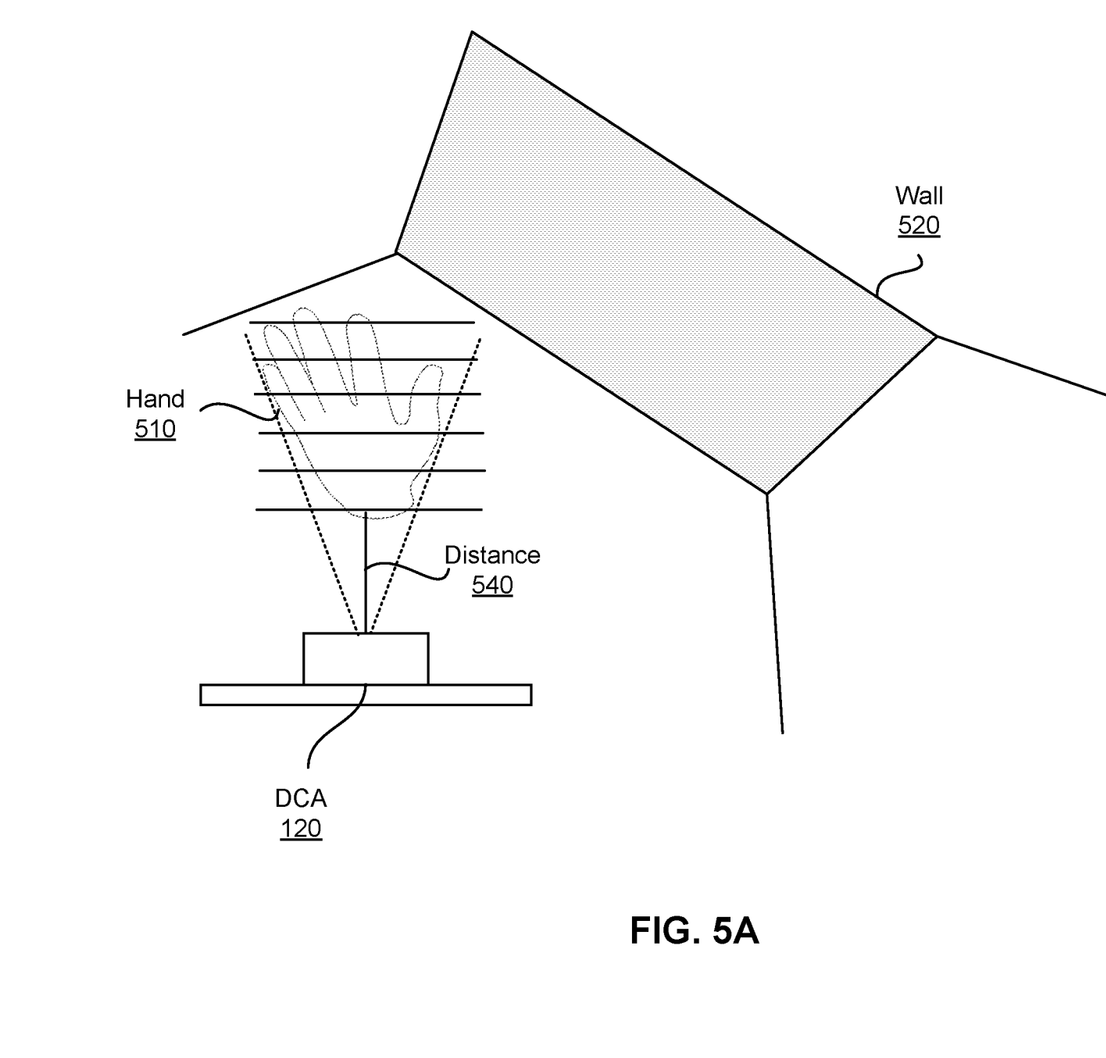
FIG. 5A shows an example arrangement of a depth camera assembly projecting a structured light pattern of lines onto an object in a local area, in accordance with an embodiment.

FIG. 5A shows an example arrangement of the DCA 120 projecting a SL pattern of lines onto an object (e.g., a hand 510) in a local area (e.g., local area 305), in accordance with an embodiment. In one embodiment, the DCA 120 may be pointed towards a nearby object, such as the hand 510. As shown in FIG. 5A, the hand 510 is in the FOV of the user, as indicated by being within the dotted lines extending from the DCA 120. The controller 330 of the DCA 120 determines the distance 540 from the hand 510 to the DCA 120 to be within a depth zone, for example 1 to 3 meters, and selects a SL type of patterned lines based on this depth information.

Figure 5B:
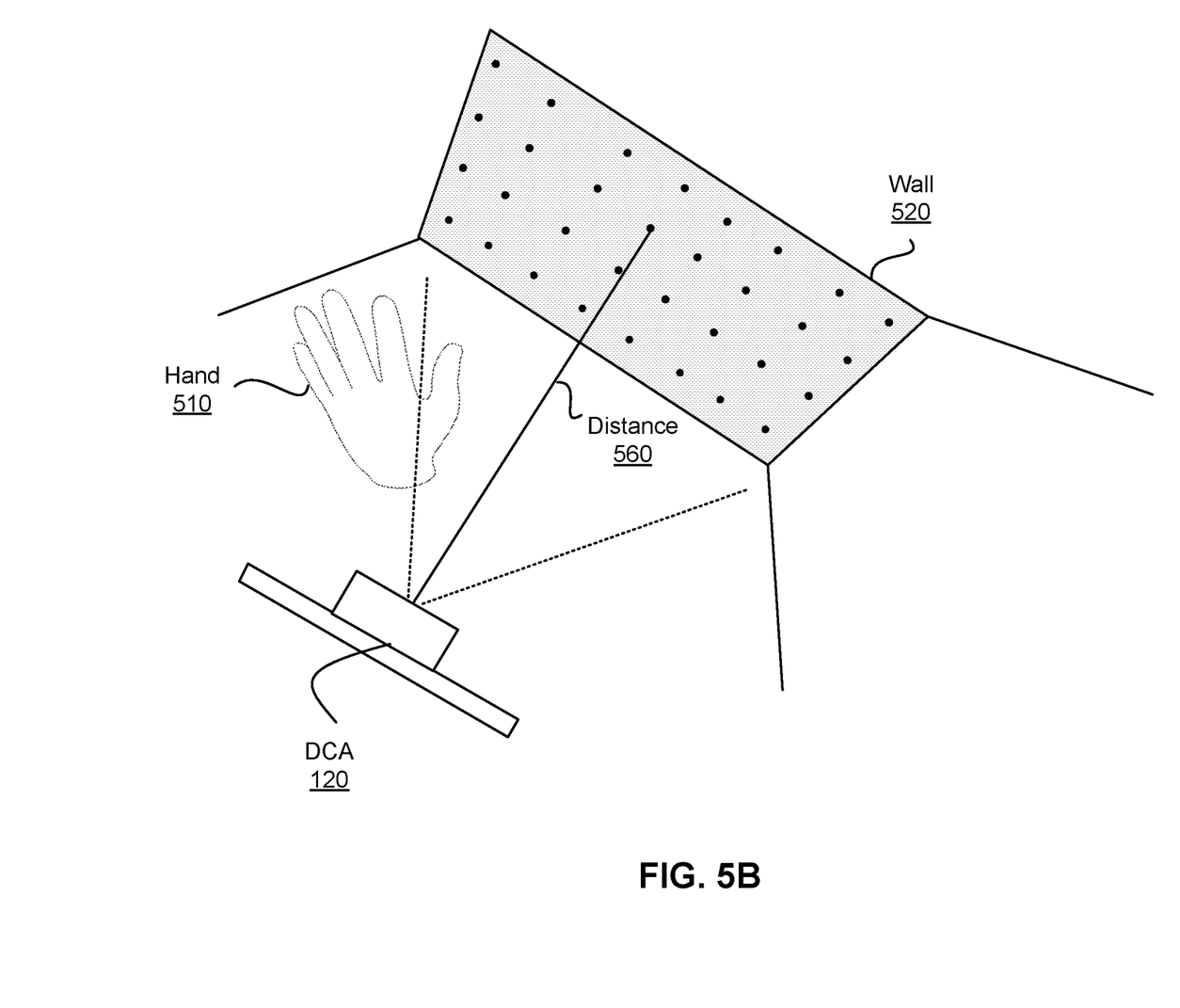
FIG. 5B shows an example arrangement of a depth camera assembly projecting a structured light pattern of dots onto an object in a local area, in accordance with an embodiment.

FIG. 5B shows an example arrangement of the DCA 120 projecting a SL pattern of dots onto an object in a local area (e.g., local area 305), in accordance with an embodiment. In one embodiment, the DCA 120 may be pointed towards an object further away than the hand 510, such as a wall 520. As shown in FIG. 5B, the wall 520 is in the FOV of the user, as indicated by being within the dotted lines extending from the DCA 120. The controller 330 of the DCA 120 determines the distance 560 from the wall 520 to the DCA 120 to be within a depth zone, for example greater than 3 meters, and selects a SL type of patterned dots based on this depth information. A pattern of dots may have advantages over a pattern of lines over longer distances. For example, a pattern of dots will generally have higher intensities compared to a line pattern.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
an illumination source configured to project a specific type of structured light (SL) pattern, of a plurality of types of SL patterns, into a local area in accordance with instructions from a controller, the specific type of SL being one of a first type or a second type of the plurality of types of SL patterns, the first type being different from the second type of SL pattern, the local area being divided into a plurality of depth zones including a first depth zone and a second depth zone, the first depth zone being different than the second depth zone;
an imaging device configured to capture one or more images of a portion of the local area illuminated with the specific type of structured light from the illumination source; and
the controller configured to:
determine a depth zone of the plurality of depth zones for an object based on initial depth information of the object indicating that the object is within the determined depth zone, the determined depth zone being one of the first depth zone or the second depth zone, the first depth zone including a first range of depths within a first distance from the DCA, and the second depth zone including a second range of depths greater than the first distance from the DCA,
determine a material property of the object,
sort the object into a group based in part on whether the material property of the object is associated with a reflectance spectrum of human skin, determine SL illumination parameters including a type of SL pattern specific to the determined depth zone and the object being sorted into the group, the first type of SL pattern being a pattern of lines selected based on the object being within the first depth zone and the reflectance spectrum of the object being associated with human skin, and the second type of SL pattern being selected based on the object being within the second depth zone and the reflectance spectrum of the object not being associated with human skin, and responsive to the determined type of SL pattern being the pattern of lines, wherein the SL illumination parameters further includes an orientation of the pattern of lines:

determine a particular orientation of at least one feature of the object, determine a particular orientation of the pattern of lines that is perpendicular to the determined orientation of the at least one feature, instruct the illumination source to illuminate a scene using the pattern of lines and the determined orientation of the pattern of lines such that the pattern of lines is perpendicular to the at least one feature of the object such as one or more fingers of a hand of a user of the DCA, instruct the imaging device to capture the one or more images of the illuminated object, and determine depth information for the illuminated object based on the captured one or more images.

2. The DCA of claim 1, wherein the DCA is part of a head-mounted display (HMD) comprising:

an electronic display element configured to display a virtual object based in part on the depth information; and an optics block configured to direct light from the electronic display element to an exit pupil of the HMD.

3. The DCA of claim 1, wherein the illumination source comprises a single emitter and a plurality of diffractive optical elements to produce the plurality of types of structured light.

4. The DCA of claim 1, wherein the illumination source comprises a plurality of emitters, each emitter having a corresponding diffractive optical element to produce the plurality of types of structured light.

5. The DCA of claim 4, wherein a first emitter of the plurality of emitters and corresponding diffractive optical element is configured to produce a pattern of dots and a second emitter of the plurality of emitters and corresponding diffractive optical element is configured to produce a pattern of lines.

6. The DCA of claim 1, wherein the first depth zone is between 1 meter and 3 meters relative to the DCA.

7. The DCA of claim 1, wherein the second depth zone is larger than 3 meters relative to the DCA and the second type of SL pattern is a pattern of dots.

8. The DCA of claim 1, wherein SL illumination parameters are selected from a group consisting of: a SL pattern type, an intensity of the SL pattern, and a frequency at which the SL pattern is emitted.

9. The DCA of claim 1, wherein the initial depth information associated with the object is based in part on a calibration step which includes determining depth information based on a set of different SL patterns.

10. A depth camera assembly (DCA) comprising:

an illumination source configured to project a specific type of structured light (SL) pattern, of a plurality of types of SL patterns, into a local area in accordance with instructions from a controller, the specific type of SL being one of a first type or a second type of a plurality of types of SL patterns, the first type being different from the second type of SL pattern, the local area being divided into a plurality of depth zones including a first depth zone and a second depth zone, the first depth zone being different than the second depth zone;

an imaging device configured to capture one or more images of a portion of the local area illuminated with the specific type of structured light from the illumination source; and the controller configured to:

instruct the illumination source to illuminate a scene using a predetermined SL pattern, instruct the imaging device to capture one or more calibration images of the illuminated scene, provide the captured calibration images to a virtual reality (VR) console, wherein the VR console is configured to:

identify an object in the portion of the scene, determine a depth zone of the plurality of depth zones for the object based on initial depth information of the object indicating that the object is within the determined depth zone, the determined depth zone being one of the first depth zone or the second depth zone, the first depth zone including a first range of depths within a first distance from the DCA, and the second depth zone including a second range of depths greater than the first distance from the DCA, determine a material property of the object, sort the object into a group based in part on whether the material property of the object is associated with a reflectance spectrum of human skin, determine SL illumination parameters including a type of SL pattern specific to the determined depth zone and the object being sorted into the group, the first type of SL pattern being a pattern of lines selected based on the object being within the first depth zone and the reflectance spectrum of the object being associated with human skin, and the second type of SL pattern being selected based on the object being within the second depth zone and the reflectance spectrum of the object not being associated with human skin, and responsive to the determined type of SL pattern being the pattern of lines, wherein the SL illumination parameters further includes an orientation of the pattern of lines:

determine a particular orientation of at least one feature of the object, determine a particular orientation of the pattern of lines that is perpendicular to the determined orientation of the at least one feature; and responsive to the determined type of SL pattern being the pattern of lines:

instruct the illumination source to illuminate the scene using the SL pattern of lines and the determined orientation of the pattern of lines such that the pattern of lines is perpendicular to the at least one feature of the object such as one or more fingers of a hand of a user of the DCA, instruct the imaging device to capture the one or more images of the illuminated object, and provide the captured one or more images of the illuminated one or more objects to the virtual reality console, wherein the virtual reality console determines the depth information for the illuminated object based on the captured one or more images.

11. The DCA of claim 10, wherein the DCA is part of a head-mounted display (HMD) comprising:
an electronic display element configured to display a virtual object based in part on the depth information; and
an optics block configured to direct light from the electronic display element to an exit pupil of the HMD.

12. The DCA of claim 10, wherein the first depth zone is between 1 meter and 3 meters relative to the DCA.

13. The DCA of claim 10, wherein SL illumination parameters are selected from a group consisting of: a SL pattern type, an intensity of the SL pattern, and a frequency that a SL pattern is emitted.

14. The DCA of claim 10, wherein the initial depth information associated with the object is based in part on a calibration step which includes determining depth information based on a set of different SL patterns.

15. The DCA of claim 10, wherein the initial depth information associated with the object is based in part on previous depth determination.

16. A depth camera assembly (DCA) comprising:
an illumination source configured to project a specific type of structured light (SL) pattern, of a plurality of types of SL patterns, at a specific frequency, into a local area in accordance with instructions from a controller, the specific type of SL being one of a first type or a second type of the plurality of pattern types of SL patterns, the first type being different than the second type of SL pattern, the local area being divided into a plurality of depth zones including a first depth zone and a second depth zone, the first depth zone being different than the second depth zone;
an imaging device configured to capture one or more images of a portion of the local area illuminated with the specific type of structured light from the illumination source; and
the controller configured to:
identify an object in the portion of the local area,
determine a depth zone associated with the object, based on initial depth information associated with the object indicating that the object is within the determined depth zone, the determined depth zone being one of the first depth zone or the second depth zone, the first depth zone including a first range of depths within a first distance from the DCA, and the second depth zone including a second range of depths greater than the first distance from the DCA,
determine a material property of the object,
sort the object into a group based in part on whether the material property of the object is associated with a reflectance spectrum of human skin,
determine SL illumination parameters including a type of SL pattern and frequency specific to the determined depth zone of the object and the object being sorted into the group, the first type of SL pattern being a pattern of lines and a first frequency being selected based on the object being within the first depth zone and the reflectance spectrum of the object being associated with human skin, and the second type of SL pattern and a second frequency being selected based on the object being within the second depth zone and the reflectance spectrum of the object not being associated with human skin, and
responsive to the determined type of SL pattern being the pattern of lines, wherein the SL illumination parameters further includes an orientation of the pattern of lines:
determine a particular orientation of at least one feature of the object,
determine a particular orientation of the pattern of lines that is perpendicular to the determined orientation of the at least one feature,
instruct the illumination source to illuminate a scene with the pattern of lines the determined frequency, and the determined orientation of the pattern of lines such that the pattern of lines is perpendicular to the at least one feature of the object such as one or more fingers of a hand of a user of the DCA,
instruct the imaging device to capture the one or more images of the illuminated object, and
determine depth information for the illuminated object based on the captured one or more images.

17. The DCA of claim 16, wherein the first depth zone is between 1 meter and 3 meters relative to the DCA, the second type of SL is a pattern of dots, and the second depth zone is larger than 3 meters relative to the DCA.

18. The DCA of claim 16, wherein the DCA is part of a head-mounted display (HMD) comprising:
an electronic display element configured to display a virtual object based in part on the depth information; and
an optics block configured to direct light from the electronic display element to an exit pupil of the HMD.

19. The DCA of claim 1, wherein the controller is further configured to:
determine the initial depth information of the object.

20. The DCA of claim 1, wherein the second type of SL pattern is a dot pattern.

21. The DCA of claim 1, wherein the determined type of SL pattern is the pattern of lines, the SL illumination parameters further include a frame frequency of the pattern of lines, and the controller is further configured to:
determine a particular frame frequency of the pattern of lines based on a rate of movement of the object; and
instruct the illumination source to illuminate the scene using the determined frame frequency such that the frame frequency of the pattern of lines is increased when the rate of movement of the object increases such as a movement of one or more hands of a user of the DCA.

* * * * *

UNITED STATES PATENT AND TRADEMARK OFFICE
CERTIFICATE OF CORRECTION

PATENT NO. : 10,957,059 B1
APPLICATION NO. : 15/698975
DATED : March 23, 2021
INVENTOR(S) : Dov Katz et al.

Page 1 of 1

It is certified that error appears in the above-identified patent and that said Letters Patent is hereby corrected as shown below:

In the Claims

In Column 18, Claim 16, Line 21, delete "lines" and insert -- lines, --, therefor.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*